United States Patent [19]

Unno

[11] Patent Number: 4,644,436

[45] Date of Patent: Feb. 17, 1987

[54] APPARATUS FOR DETERMINING THE TYPE AND REMAINING CAPACITY OF A TAPE

[75] Inventor: Hiroaki Unno, Ichikawa, Japan

[73] Assignee: Tokyo Shibaura Denki Kabushiki Kaisha, Kawasaki, Japan

[21] Appl. No.: 494,316

[22] Filed: May 13, 1983

[30] Foreign Application Priority Data

| May 19, 1982 [JP] | Japan | 57-84312 |
| May 19, 1982 [JP] | Japan | 57-84313 |
| Oct. 25, 1982 [JP] | Japan | 57-186938 |

[51] Int. Cl.⁴ .............. G11B 15/48; G11B 15/18; G11B 17/00; G11B 19/02
[52] U.S. Cl. .................... 360/137; 360/71; 360/72.3; 360/74.4
[58] Field of Search ........ 360/71, 72.3, 74.2, 360/74.4, 74.6, 137; 242/191; 116/309, 278, 67 A

[56] References Cited

U.S. PATENT DOCUMENTS

| 3,564,219 | 2/1971 | Mutziger | 360/137 |
| 3,849,661 | 11/1974 | Beiter | 242/191 |
| 4,001,552 | 1/1977 | Muller | 242/191 |
| 4,062,048 | 12/1977 | Weber | 360/72.3 |
| 4,246,616 | 1/1981 | Hiraguri et al. | 360/74.4 |
| 4,280,159 | 7/1981 | Nakayama | 360/137 |
| 4,335,411 | 6/1982 | Dischert | 360/137 |
| 4,338,645 | 7/1982 | Mohri et al. | 360/137 |
| 4,347,538 | 8/1982 | Klank | 360/72.3 |
| 4,363,048 | 12/1982 | Tanaka et al. | 360/72.3 |
| 4,381,089 | 4/1983 | Kondo | 242/191 |
| 4,404,604 | 9/1983 | Ueki et al. | 360/74.4 |

FOREIGN PATENT DOCUMENTS

| 54-143614 | 11/1979 | Japan | 360/137 |
| 54-145513 | 11/1979 | Japan | 360/137 |
| 55-1677A | 1/1980 | Japan | 360/137 |
| 55-45175 | 3/1980 | Japan | 360/137 |
| 55-64677 | 5/1980 | Japan | 360/137 |
| 56-117380 | 9/1981 | Japan | 360/137 |

Primary Examiner—A. J. Heinz
Assistant Examiner—Alfonso Garcia
Attorney, Agent, or Firm—Cushman, Darby and Cushman

[57] ABSTRACT

The respective rotations of first and second reel-rotation detection discs which are rotating in interlocking relation with a take-up reel and a supply reel, respectively, are detected by first and second reel-rotation detection members. The counting periods of first and second pulse counters are determined by the output pulses of the first and second reel-rotation detection means, respectively. These pulse counters count the outputs from a pulse generator for generating pulses related to the amount of travel of a tape. Counted values A1 and A2 are obtained by the counting operations of the pulse counters and supplied to a microcomputer which includes a CPU, ROM, RAM, and work memory. The value of $A1^2+A2^2$ is determined and this value is compared with specified values or constants representing the type of tape which are previously stored in RAM. In accordance with the result of this comparison, determination is made of the type of tape currently in use. Based on the kind of tape being used, other characteristics which are known allow calculation of remaining amount or time of tape left.

13 Claims, 6 Drawing Figures

| Type of Tape | Entire Length of Tape (L0) (m) | Thickness of Tape (d) (μm) | Radius of Hub (R) (mm) | Specified Value $(2\pi F/V)^2 (2R^2 + L_0 d/\pi)$ | |
|---|---|---|---|---|---|
| | | | | V = 20 (mm) | V = 13.33 (mm) |
| L750 | 222 | 14.6 | 15 | 131600 | 296200 |
| L500 | 150 | 20.0 | 15 | 124800 | 280900 |
| L370 | 114 | 20.0 | 15 | 104400 | 235100 |
| L250 | 78 | 20.0 | 26 | 164200 | 369600 |
| L165 | 54 | 20.0 | 26 | 150500 | 340300 |
| L125 | 42 | 20.0 | 26 | 143800 | 323800 |

FIG. 6

| Type of tape | Entire length L0 (mm) | Thickness d (mm) | Radius of hub R(mm) | Specified value (f=360, v=20) |
|---|---|---|---|---|
| L750 | 222 | 14.6 | 15 | $189 \times 10^5$ |
| L500 | 150 | 20.0 | 15 | $180 \times 10^5$ |
| L370 | 114 | 20.0 | 15 | $150 \times 10^5$ |
| L250 | 78 | 20.0 | 26 | $236 \times 10^5$ |
| L165 | 54 | 20.0 | 26 | $217 \times 10^5$ |
| L125 | 42 | 20.0 | 26 | $207 \times 10^5$ |

APPARATUS FOR DETERMINING THE TYPE AND REMAINING CAPACITY OF A TAPE

BACKGROUND OF THE INVENTION

The present invention relates to an apparatus for determining the type and remaining capacity of a tape.

In a recording and reproducing apparatus such as a video tape recorder (VTR), audio tape recorder, or the like, a magnetic tape is used as a signal recording medium. This tape is usually received within a tape cassette and is wound at its ends around a take-up reel hub and a tape supply reel hub, respectively. When the tape cassette is loaded in the recording and reproducing apparatus, it is important for a tape user to have a clear knowledge of the remaining capacity of the tape wound around the tape supply reel.

When the user has no knowledge of the remaining capacity of the tape while the apparatus is in a recording mode, there is a possibility that recording of an important program may be missed due to a shortage of the remaining capacity of the tape, or that uneconomical use of the tape may occur due to excess remaining in the tape.

Also, if the user knows the remaining capacity of the tape, such knowledge is convenient in finding the starting position of a recorded program to use the remaining tape capacity. Since there are more than one types of tape cassettes, if the user knows the type of tape to be used, he can determine the entire recording time of the tape.

U.S. Pat. No. 4,280,159 discloses an example of a device for displaying the remaining capacity of such tape. This device is designed to measure the rotational periods Ts and Tt of a tape-supply reel and a take-up reel and to determine the value of $Ts^2 + Tt^2$. Then, the device discriminates the type of tape by using the value of $Ts^2 + Tt^2$ and calculates the remaining tape capacity by using the discriminated character of the tape and the rotational periods Ts and Tt.

However, measurement is made of the rotational periods of the reels based on the speed of tape travel being kept constant. For this reason, when variations occur in the speed of tape during the measurement of the rotational periods of the reels, the measurement will contain errors.

SUMMARY OF THE INVENTION

The object of the present invention is to provide an apparatus for determining the type and remaining capacity of a tape. Thus, it becomes possible to obtain with high precision and with the use of a simple means the information necessary to calculate the type of tape and the remaining capacity of the tape wound around a tape supply reel, the information containing no errors attributable to variations in speed of the tape.

To attain the above object, the invention is provided with first and second reel rotation detecting means for detecting the rotations of a take-up reel and tape-supply reel and generating pulses of a number corresponding to the rotational speed of each of the reels, a pulse generating means for generating the pulses related to the quantity of tape travel, pulse counter means for counting the number of the pulses (A1, A2) outputted from said pulse generating means during specified rotational periods of said reels, a calculating means for calculating $(A1)^2 + (A2)^2$ by the use of the counted numbers (A1), (A2) outputted from said counter means, and discriminating means for comparing the value of $(A1)^2 + (A2)^2$ outputted from said calculating means with a plurality of previously stored specified values, thereby determining the nearest approximate value to the value $(A1)^2 + (A2)^2$, whereby the type of the tape is discriminated in accordance with the specified value determined by said discriminating means. The counted number (A2) of the pulse counter means and the determined particular values are used to calculate the remaining tape capacity.

DETAILED DESCRIPTION OF THE PREFERRED EMBODIMENTS

Figure 1:
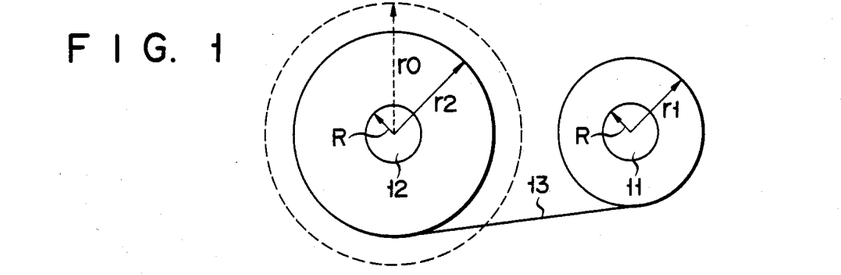
FIG. 1 is a view for explaining the tape winding in a tape cassette.

FIG. 1 shows the tape winding in a tape cassette. The reference numeral 11 denotes a take-up reel hub and the reference numeral 12 denotes a tape supply reel hub. It is now assumed that the radius of the reel hubs 11 and 12 is represented by R; the radius of tape winding as measured from the center of the take-up reel hub 11 is represented by r1; and the radius of tape winding as measured from the center of the tape-supply reel hub 12 is represented by r2. It is also assumed that the largest possible radius of winding of the tape 13 is represented by r0, and the hole length of the tape is represented by L0.

(1) Now, the area of projection of the tape, the following equality can be established $$\{(r1)^2 - R^2\} + \{(r2)^2 - R^2\} = \{(r0)^2 - R^2\} \tag{1}$$

By using the equation (1), the following equation is obtained.

$$(r1)^2 + (r2)^2 = (r0)^2 + R^2 \tag{2}$$

The right side of the equation (2) is a specified value or constant for a particular tape of type.

Assume now that the length of the tape portion wound around the take-up reel is represented by L1, the number of turns of that tape portion by N1, the radius of tape winding corresponding to that tape portion by r1, and tape thickness by d, the following equation (3) is established.

$$r1 = R + N1 \cdot d \tag{3}$$

Accordingly, the following equation holds true.

$$L1 = \int_0^{N1} 2\pi \cdot r1 \cdot dN = 2\pi \cdot N1 \cdot R + \pi(N1)^2 \cdot d \tag{4}$$

From the equation (4), the following equation is obtained.

$$d \cdot N1 = -R + \sqrt{R^2 + \frac{L1 \cdot d}{\pi}} \quad (5)$$

When substituting the equation (5) into the equation (3), the following equation is obtained.

$$r1 = \sqrt{R^2 + \frac{L1 \cdot d}{\pi}} \quad (6)$$

Since it is when L1=L0 that the radius of tape winding becomes the largest in the equation (6), r0 can be expressed as follows.

$$r0 = \sqrt{R^2 + \frac{L0 \cdot d}{\pi}} \quad (7)$$

Accordingly, $$(r0)^2 = R^2 + \frac{L0 \cdot d}{\pi} \quad (8)$$

It is to be noted here that the hub radius (R), entire tape length (L0) and tape thickness (d) are specified particular values of a tape according to type. Accordingly, it is possible to discriminate the type of a tape by using the value of $R^2 + L0 \cdot d/\pi$. Further, by using the equations (2) and (8), the following is obtained.

$$(r1)^2 + (r2)^2 = 2R^2 + L0 \cdot d/\pi \quad (9)$$

The right side of this equation (9) is also a specified value peculiar to a particular tape according to the type thereof, and therefore determining the value of $(r1)^2 + (r2)^2$ means discriminating the type of a tape involved.

(2) Next, to consider the area of projection SS of the tape wound around the supply reel, the following holds true.

$$SS = \pi\{(r2)^2 - R^2\} \quad (10)$$

Assume now that the thickness of the tape is represented by d and the length of the tape wound around the supply reel by LS, then the equation (10) can be rewritten as follows.

$$SS = LS \cdot d \quad (11)$$

From the equations (10) and (11), the following equation is obtained.

$$i \, LS \cdot d = \pi\{(r2)^2 - R^2\} \quad (12)$$

Thus, the following holds true.

$$LS = \pi\{(r2)^2 - R^2\}/d \quad (13)$$

Since the tape thickness d and the hub radius R are respectively unvaried values, the tape length LS of the supply reel side will be obtained if the radius of tape winding r2 is determined. When determination is made of the tape length LS on the supply reel side, then the remaining amount of time (Ts) of the tape can be determined, when the speed or velocity of tape travel is assumed to be $V_P$, as follows.

$$TS = LS/V_P \quad (14)$$

Figure 2:
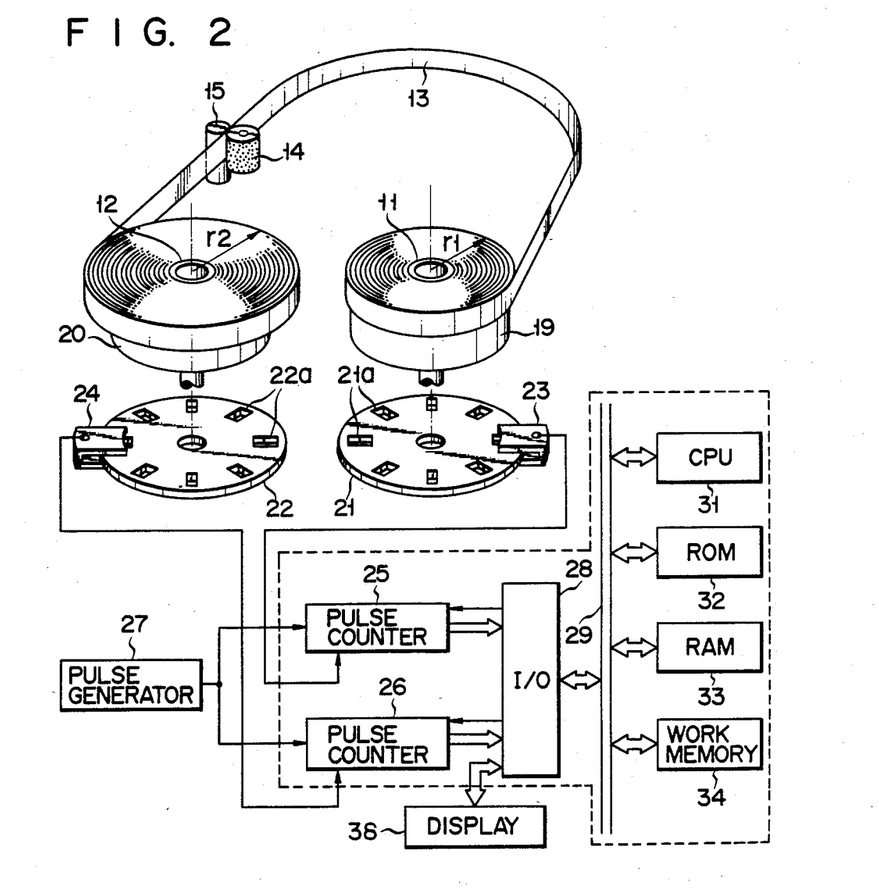
FIG. 2 is a view showing the construction of an apparatus for determining the type and remaining capacity of a tape according to an embodiment of the invention.

FIG. 2 shows the apparatus for determining the type and remaining capacity of a tape according to a first embodiment of the present invention. The tape 13 is clamped between a pinch roller 14 and a rotating capstan 15, and is driven by a capstan motor. The rotations of the take-up reel 19 and supply reel 20 are transmitted to rotary discs 21 and 22, respectively. The rotary discs 21 and 22 have a plurality of apertures 21a and 22a equidistantly provided on co-axial circumferences, respectively. At the fixed positions on the rotational loci of the apertures 21a and 22a, there are provided reel-rotation sensing means 23 and 24 having photocouplers. From these reel-rotation sensing means 23 and 24, reel-rotation detection pulses having frequencies corresponding to the rotational speeds of the reels are obtained. The reel-rotation detection pulses outputted from the reel rotation sensing means 23 and 24 are respectively applied to control terminals of pulse counters 25 and 26. The output pulse from a pulse generator 27 for generating a pulse related to the amount of tape travel is inputted to count pulse input terminals of the pulse counters 25 and 26. As the pulses related to the tape travel, there are control pulses at the time of reproduction of VTR, a reproduction control pulse and, at the time of recording, an input signal pulse of the control head and pulses generated from a capstan-motor-rotation detector for detecting the rotation of the capstan drive motor (not shown). The pulse counter 25 has its input gate rendered conductive during a period in which this counter is applied with, for example eight pulses from the reel-rotation detection means 23. The eight pulses correspond to one rotation of the reel. The pulse counter 25 can thereby count the pulse from the pulse generator 27. Similarly, the pulse counter 26 has its input gate rendered conductive during a period in which this counter is supplied with, for example eight pulses from the reel-rotation detection means 24. During this period of time, the pulse counter can thereby count the pulse from the pulse generator 27. The count data of the pulse counter 25 and 26 are stored, through an I/O port 28 and a data bus 29, in a work memory 34. This data storage is carried out in accordance with an instruction from a central processing unit 31. After it causes the data of the pulse counters 25 and 26 to be transferred to the work memory 34, the CPU 31 causes a clear signal to be applied to the pulse counters 25 and 26, thereby commencing the next counting operation. The pulse counters 25 and 26, I/O port 28, CPU 31, read only memory (ROM) 32, random access memory (RAM) 33 and work memory 34 comprise one microcomputer. ROM 32 is stored with a program, while the RAM 33 is loaded with various data. The RAM 33 is stored with specified values corresponding to the types of tape, that is, data peculiar to each different tape. The integrated circuit forming this microcomputer is named "TM 47c22F" which is manufactured by TOSHIBA. The "TM 47c22F" is surrounded by a dotted line in FIGS. 2, 3 and 4.

Reference will now be made to the arithmetic operational means and discriminating means within the microcomputer.

It is now assumed that the pulse counters 25 and 26 count the pulses A1 and A2 during the period in which the corresponding reels 19 and 20 make one entire rotation. The number of the pulses counted is related to the amount of tape travel and the following equations are established.

$$2\pi r1 = k \cdot A1 \qquad (15)$$

$$2\pi r2 = k \cdot A \qquad (16)$$

where k is a constant. Accordingly, the following equations are obtained.

$$r1 = k \cdot A1/2\pi \qquad (17)$$

$$r2 = k \cdot A2/2\pi \qquad (18)$$

Thus, it is possible to determine the radius r1 or r2 of tape winding of each reel. When substituting the equations (17) and (18) into the equation (9), the following equation (19) is obtained.

$$\left(\frac{k \cdot A1}{2\pi}\right)^2 + \left(\frac{k \cdot A2}{2\pi}\right)^2 = 2R^2 + L0 \cdot d/\pi \qquad (19)$$

This equation can be rewritten as follows.

$$(A1)^2 + (A2)^2 = \left(2R^2 + \frac{L0 \cdot d}{\pi}\right)\left(\frac{2\pi}{k}\right)^2 \qquad (20)$$

The right side of the equation (20) is a value or constant peculiar to a particular tape according to the type thereof.

Accordingly, by determining the value $(A1)^2+(A2)^2=A0$ by the calculating means the specified value or constant peculiar to such a particular tape is calculated.

Next, the value of A0 is compared with a plurality of data stored in RAM (33) representing the specified values peculiar to each different tapes. For example, calculation is carried out for the purpose of determining the difference between the value A0 and each of the specified values of different tapes, thereby determining the specified value of tape corresponding to the smallest difference among such differences. The smallest difference indicates that the specified value obtained is the nearest or equal to the value A0. It is thus determined that the tape in use is of a type having the specified value thus obtained.

When the type of tape is determined, the thickness d of tape and the radius R of the reel hub are respectively determined as well. Accordingly, it is also possible to calculate the remaining capacity of tape by using the radius r2 of tape winding of the supply reel side. For calculation of this remaining capacity of tape, the equation (13) is used. The remaining capacity of tape is displayed on a digital basis by a display device 38. The remaining amount or capacity of tape calculated based on the equation (13) indicates the length of tape of the supply reel side. Where the remaining amount of time of tape is necessary, the arithmetic operation of $Ts = LS/V_p$, that is, the arithmetic operation of the equation (14) is carried out. If arrangement is made such that the arithmetic-operational program can be designated in accordance with the user's desire, it is possible to display the remaining length LS of tape and the remaining amount of time Ts of tape.

According to the above-mentioned apparatus for determining the type and remaining capacity of tape, the construction of the data collecting means for discriminating and determining the type of tape or the remaining capacity of tape is very simple and yet enables data collection with high precision. Since the input gates of the pulse counters 25 and 26 are respectively controlled by the outputs of the reel-rotation detecting means 23 and 24, a program for controlling the pulse counters 25 and 26 is not particularly necessary and such control only necessitates the clear pulse. According to this apparatus, the pulse generator 27 generates a pulse related to the amount of tape travel. This pulse can be, for example, an input control signal (vertical sync signal) of the control head, a reproduction control pulse, capstan pulse or the like. In the pulse counter 25 or 26, the number of the pulses generated from the pulse generator 27 is counted during a predetermined rotational cyclic period of the reel. Accordingly, the counted value of each pulse counter 25, 26 represents the amount of tape travel corresponding to a predetermined rotational cyclic period of a corresponding reel 19 or 20. Thus, it is possible to determine the amount of tape travel without considering the speed of tape travel. For this reason, the control signal, the reproduced control pulse and the capstan pulse are stabilized. Further, according to said apparatus, the data necessary for discriminating the type of tape and for calculating the remaining amount of tape can be collected by means by as few as two pulse counters 25 and 26. Thus, even if there are variations of the tape speed during the discrimination of the type and the calculation of the remaining amount of tape, the discrimination and the calculation can be exactly obtained.

The first and second reel-rotation detecting means 23 and 24 in the above-mentioned embodiment use a photocoupler, but the invention is not limited thereto. For example, it is possible to mount a pair of permanent magnets 101 and 102 on the rotary discs 21 and 22 and dispose detecting coils 104 and 105 opposite the rotational loci of those permanent magnets. The drawing shows a plurality of said apertures with respect to each of the rotary discs 21 and 22, but, basically, the provision of only one aperture in each disc is sufficient. However, if a plurality of the apertures 21a and 22a are provided, it is possible to increase the timing of detection of the reel rotation as compared to when one aperture is provided.

Figure 3:
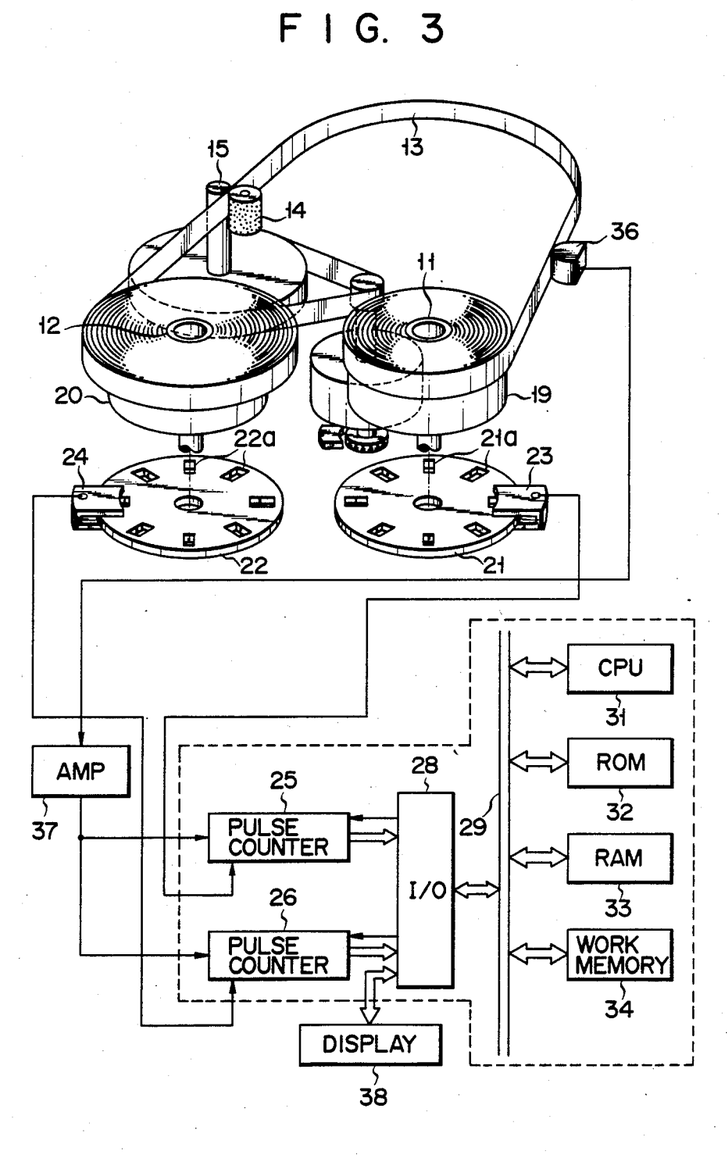
FIGS. 3 and 4 are views for explaining the construction of the apparatus according to other embodiments of the invention.

FIG. 3 shows an embodiment which uses a control head 36 and an amplifier 37 as the above-mentioned pulse generator 27. Explanation will now be made of this embodiment with reference to FIG. 3. In a video tape recorder of a rotary video head system, a control signal of a rectangular waveform having a leading edge in each cyclic period of one frame is recorded in a control track of the tape. The recording of this control signal is effected for tracking servo operation so as to permit the video head to precisely scan the video track. The leading edge of the control signal is recorded at specified intervals on the tape.

If the frame frequency is represented by F and the speed of tape travel at the time of recording by V, the leading edge of the control signal is recorded at specified intervals of V/F. Accordingly, if the number of the output pulses based on the control signals generated during one rotation of the reel is counted, it is possible to determine the circumference of the reel.

The pulse counters 25 and 26 count the control pulses which are obtained in accordance with the control signals during the periods in which the corresponding take-up reel 19 and supply reel 20 make one rotation, respectively. The control pulse is obtained by amplifying and wave shaping the control signal.

When it is now assumed that the respective numbers of the control pulses obtained during the periods in which the take-up reel 19 and supply reel 20 make one rotation are represented by C1 and C2, the following equations are established.

$$2\pi r1 = (V/F) \cdot C1 \quad (21)$$

$$2\pi r2 = (V/F) \cdot C2 \quad (22)$$

where F represents the frame frequency and V the recording speed of tape. From the equations (2), (9), (21) and (22), the following equation is obtained.

$$\left(\frac{VC1}{2\pi F}\right)^2 + \left(\frac{VC2}{2\pi F}\right)^2 = R^2 + \left(R^2 + \frac{L0 \cdot d}{\pi}\right) \quad (23)$$

The equation (23) can be rewritten as follows.

$$(C1)^2 + (C2)^2 = \left(\frac{2\pi F}{V}\right)^2 \cdot \left(2R^2 + \frac{L0 \cdot d}{\pi}\right) \quad (24)$$

If the speed of tape travel at the time of recording, represented by V, is kept constant, the right side of the equation (24) is a value or constant which is peculiar to a particular tape.

The speed of tape travel at the time of recording is previously determined for each standard of the video tape recorder, and accordingly the video tape recorder is so designed that the capstan servo moves at such speed. Accordingly, it is possible to calculate beforehand the right side of the equation (24) in regard to each particular tape involved. By comparing the data of each particular tape obtained from the previous calculation with the value of $(C1)^2 + (C2)^2$ obtained from the counted number of the control signals, the data nearest to that value is determined, making it possible to determine that the tape corresponding to such data is the tape which is in current use.

Meanwhile, the speed of tape travel for recording is not always one value, but in some cases two or three values are standardized for the video tape recorder. These speeds are usually ratios of integers, for example, 1:1, 1:2, 1:3. Since in the right side of the equation (24) the V is multiplied by itself, the ratio between the $V^2$ and the $V^2$ is 1:1, 1:4, 1:9. Since the value of this speed type is sufficiently greater than the difference between the values of particular tapes, it is possible to discriminate each of all the tape types (including the speed types) by measuring the $(C1)^2 + (C2)^2$ and also to discriminate the speed of tape travel for recording by measuring the same.

Figure 5:
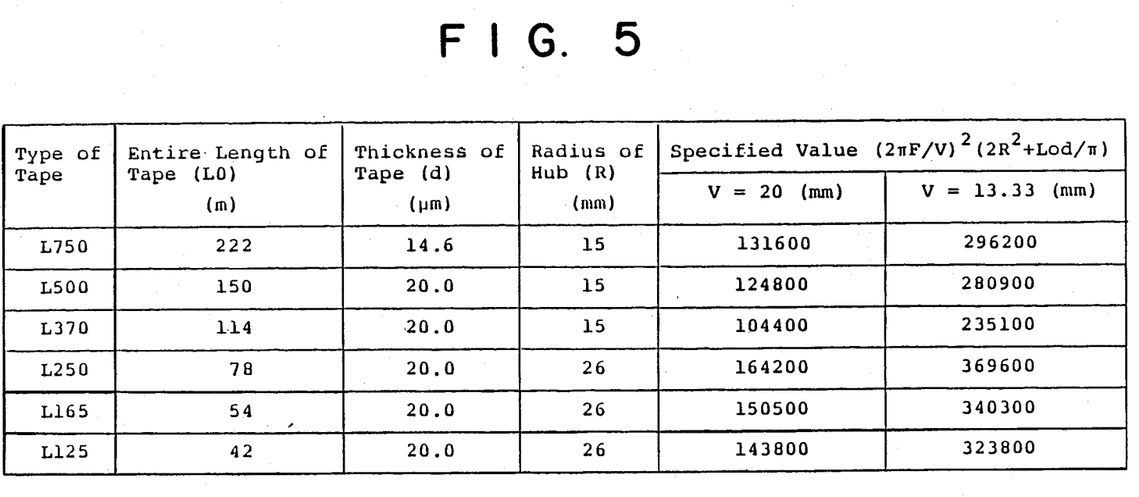
FIG. 5 shows values enabling determination of the type of tape being used.

In FIG. 5, the values of the right side of the equation (24) which have been determined are presented, when the tape recording speed V=20 mm/sec. and this V=13.33 mm/sec., in regard to each of six representative tape types L750, L500, L370, L250, L165 and L125 which are included under what is called the "Beta (β) Standard".

As seen from FIG. 5, each tape has a different specified value and, when the recording speed is different, has corresponding specified values. Accordingly, the numbers C1 and C2 of the control pulses obtained during the periods in which the reels 19 and 20 make one rotation are counted by the pulse counters 25 and 26, the value of $(C1)^2 + (C2)^2$ is determined by the microcomputer, and then this value is compared with the specified values presented in FIG. 5. If determination is made of the specified value or constant nearest to that value, then it is possible to judge that the tape having this constant is the one which is currently in use.

The specified values to be compared with the value of $(C1)^2 + (C2)^2$, in case of FIG. 5, are twelve in number ($6 \times 2 = 12$). As an example, the procedure for programming is to compare the value of $(C1)^2 + (C2)^2$ with all the specified values (twelve values) in the sequential order and to determine the differences therebetween. However, this procedure requires a large amount of time. If it is possible to discriminate first the speed of tape travel for recording, it is sufficient that the specified values to be compared with the value of $(C1)^2 + (C2)^2$ are half in number (six). When it is desired to discriminate the speed of tape travel for recording (V=20 mm/sec. or V=13.33 mm/sec.), it is sufficient to determine whether or not the value of $(C1)^2 + (C2)^2$ is great with respect to a suitable boundary value (B) between 164200 (the greatest specified value when V=20 mm/sec.) and 235100 (the smallest specified value when V=13.33 mm/sec.). If $B > (C1)^2 + (C2)^2$, the tape in current use is one for which, at the time of recording, the velocity is V=20 mm/sec. On the other hand, if $B < (C1)^2 + (C2)^2$, the tape currently in use is one for which, at the time of recording, the velocity is V=13.33 mm/sec.

If, as above, the velocity of tape travel for recording can be discriminated as a result of comparison between the boundary value (B) and the value of $(C1)^2 + (C2)^2$, the specified values to be compared with the value of $(C1)^2 + (C2)^2$ may be six in number.

In the foregoing description, explanation was made on the assumption that the twelve specified values are stored in RAM 33 beforehand, but the number of these specified values can be reduced to half.

For example, the six specified values in case of V=20 mm/sec. and the above-mentioned boundary value (B) are previously stored as constants in RAM 33. The tape type discriminating procedure is as follows. First, the comparison between the value of $(C1)^2 + (C2)^2$ and the said boundary value (B) is made to determine the velocity of tape travel for recording. Where determination has been made such that V=20 mm/sec., the value of $(C1)^2 + (C2)^2$ is utilized as it stands and is compared with the specified values in the sequential order, whereby determination is made of the type of tape involved. When it is determined, as a result of comparison between the value of $(C1)^2 + (C2)^2$ and the boundary value (B), that $B < (C1)^2 + (C2)^2$, and determination has been made such that V=13.33 mm/sec., the following processing is carried out. The value of $(C1)^2 + (C2)^2$ is multiplied by the square of the velocity ratio. The square of the velocity ratio is $(13.33/20)^2 = (\frac{2}{3})^2 = 4/9$. Accordingly, the calculation of $4/9\{(C1)^2 + (C2)^2\}$ is carried out. This value of $4/9\{(C1)^2 + (C2)^2\}$ is a value corresponding to the specified value obtained when the tape travel for recording is made at the velocity of V=20 mm/sec. Accordingly, the value of $4/9\{(C1)^2 + (C2)^2\}$ is compared, in the sequential order, with the six specified values stored in RAM 33. Thus, detection is made of the specified value nearest to the value of $4/9\{(C1)^2 + (C2)^2\}$, whereby determination is made of the tape type in question.

Where the value of $C1^2+C2^2$ is very small as compared with the smallest value of the specified values enumerated in FIG. 5, this means that no control signal is recorded in the tape or that such control signal fails to be recorded on a normal basis. In such a case, the apparatus may be additionally arranged such that it stops its tape type discriminating operation and displays this stoppage.

In the foregoing description, explanation was made on the assumption that the counting of the control pulses is carried out during one-rotation of the reel, but the present invention is not limited thereto. Arrangement may be made such that the counting of the control pulses is conducted during an n-rotation period or 1/n-rotation period of the reel (n is a positive integer). In this case, the specified values to be compared with the value of $(C1)^2+(C2)^2$ are those values which have been prepared by multiplying the values of the right side of the equation (24) by $n^2$ or $1/n^2$. If use is made of the values prepared by multiplying the number of the control pulses by $1/n$ or $n$, the specified values based on the right side of the equation (24) can be used as they stand.

If the type of tape has been discriminated as mentioned above, the thickness d of tape as well as the radius R of reel hub is also determined as was mentioned. Thus, by using the equations (13) and (14), it is possible to determine the remaining capacity of tape, that is, the length of tape and the remaining amount of time of tape on the supply reel side.

According to the embodiment shown in FIG. 3, since use is made of the control pulse, it is also possible, at the time of fast feeding and reverse winding of the video tape recorder, to determine the remaining capacity of tape with high precision and to display the same on the display means 38.

Figure 4:
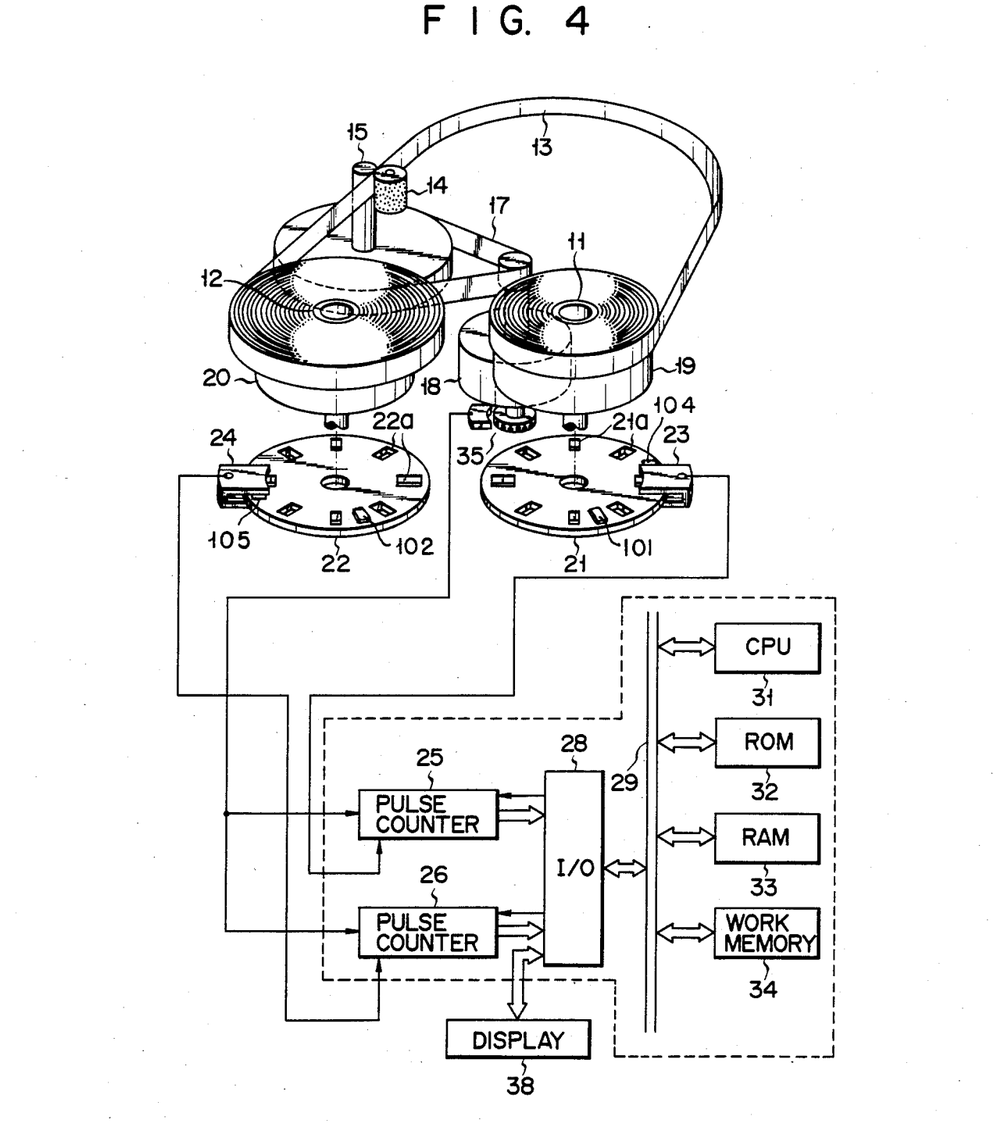

FIG. 4 shows an embodiment which uses a capstan-rotation detecting means 35 as the pulse generator 27 (shown in FIG. 2). In the video tape recorder, the rotation of the tape is effected by the capstan 15 and the pinch roller 14. In this case, the tape 13 is allowed to travel at a specified velocity and with high precision, thereby making it possible to set the video tape recorder to recording mode or reproducing mode.

The method of driving the capstan 15 includes a case wherein the rotation of a capstan motor 18 is transmitted to the capstan through a belt 17 and a case where the motor rotation is directly transmitted to the capstan 15.

In the recording or reproducing mode of the video tape recorder, it is preferable for the tape 13 to travel at a specified constant velocity and with high precision. To this end, a servo circuit is used to keep the tape velocity constant. The servo circuit necessitates the use of a pulse having a phase corresponding to the angular velocity of rotation of the capstan motor 18. Accordingly, the capstan motor 18 is attached with the capstan-rotation detecting means 35. The capstan-rotation detecting means 35 is comprised of, for example, a gear-shaped permanent magnet allowed to rotate integrally with a shaft of the motor and a coil provided around this permanent magnet, whereby a plurality of capstan-rotation detecting pulses are outputted during one rotation of the permanent magnet.

The number of the capstan-rotation detection pulses obtained from the capstan-rotation detecting means 35 is exactly in proportion to the distance of tape travel. Accordingly, it is possible to determine the circumference of the reel by counting the number of the capstan-rotation detection pulses obtained during one rotation of the reel.

The ratio of the velocity of tape travel (v) to the frequency of the capstan-rotation detection pulses (f) is kept constant. When a G number of the capstan-rotation detection pulses have been obtained, the tape in question is allowed to travel over a distance of $v/f \times G$.

Accordingly, when it is assumed that, for example, a G1 number of pulses have been obtained during one rotation of the take-up reel 19, the following equation is established.

$$2\pi r1 = (v/f) \cdot G1 \tag{25}$$

Thus, it is possible to determine the radius r1 of tape winding. With respect to the supply reel 20 side as well, the following is similarly established where a G2 number of pulses have been obtained during one rotation of the reel.

$$2\pi r2 = (v/f) \cdot G2 \tag{26}$$

Since the number of the pulses from the capstan-rotation detecting means 35 is in proportion to the distance of travel of the tape 13, it is possible to determine the radii r1 and r2 of tape winding without being affected by the variations in the velocity of tape travel.

To substitute the equations 25 and 26 into the equation 9, the following equation is obtained.

$$\left(\frac{v}{2\pi f} \cdot G1\right)^2 + \left(\frac{v}{2\pi f} \cdot G2\right)^2 = 2R^2 + \frac{L0 \cdot d}{\pi} \tag{27}$$

This equation can be rewritten as follows.

$$(G1)^2 + (G2)^2 = \left(\frac{2\pi f}{v}\right)^2 \cdot \left(2R^2 + \frac{L0 \cdot d}{\pi}\right) \tag{28}$$

In this equation, the right side indicates the specified value of tape according to the type thereof.

Figure 6:
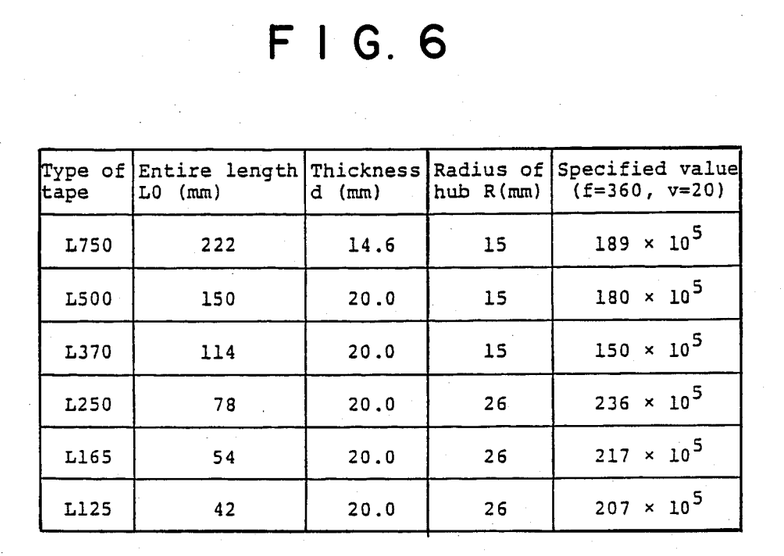
FIG. 6 shows other values based on the type of tape being used.

FIG. 6 shows the specified values of tape prepared by calculating the right side of the equation (28) in regard to six representative types of tape which are included under what is called "Beta ($\beta$) Standard"—L750, L500, L370, L250, L165 and L125.

As seen in FIG. 6 above, the specified values of the tapes differ from each other. Accordingly, at the time of discriminating the type of tape, the numbers G1 and G2 of the capstan-rotation detection pulses are obtained in the pulse counters 25 and 26 during the one-rotation periods of the take-up reel 19 and supply reel 20, respectively, and the value of $(G1)^2+(G2)^2$ is determined by the arithmetic-operational means of the microcomputer. Next, determination is made of the differences between the value of $(G1)^2+(G2)^2$ and the specified values of tape presented in FIG. 6. Thereafter, determination is made of the specified value nearest to the value of $(G1)^2+(G2)^2$, thereby determining that the tape having this specified value is one which is currently in use.

To increase the precision of discriminating the type of tape, it is sufficient to measure the number of reel-rotation detection pulses with respect to a plurality of rotational periods of each reel and determine from this value of measurement the number of reel-rotation detection pulses per rotational period with respect to each of the reels and use a sum of the respective squares of the values thus determined.

Further, when it is desired to shorten the time required for discriminating the type of tape, it is sufficient to measure the number of reel-rotation detection pulses with respect to a 1/n rotational period of each reel and calculate from this value of measurement the number of reel-rotation detection pulses per rotational period with respect to each of both the reels and use a sum of the respective values of the squares of the values thus calculated, or $(G1)^2 + (G2)^2$.

Reference will now be made to the procedure of determining the length of tape (LS) remaining on the supply reel 20 side after determining the type of tape.

From the equation (26), the following equation is obtained.

$$r2 = (v/2\pi f) \cdot G2 \tag{29}$$

By substituting the equation (29) for the equation (13), the following equation is obtained.

$$LS = \frac{\pi v^2}{4\pi^2 f^2 d} \cdot (G2)^2 - \frac{\pi R^2}{d} \tag{30}$$

$$= \frac{V^2}{4\pi f^2 d} \cdot (G2)^2 - \frac{\pi R^2}{d}$$

Next, the following equation is used for the purpose of determining the remaining amount of time (Ts) of tape on the supply reel 20 side. That is, from the equation $Ts = LS/V_P$, $$Ts = \frac{1}{V_P} \cdot \frac{1}{4\pi d} \left(\frac{v}{f}\right)^2 \cdot (G2)^2 - \frac{\pi R^2}{dV_P} \tag{31}$$

where $V_P$ represents the velocity of tape travel. As can be seen, the remaining length of tape and the remaining amount of time of tape can be found by the use of the equations (30) and (31).

Those six representative types of tape L500, L370, L330, L250, L165 and L125 for use in the video tape recorder which are included in what is called "Beta ($\beta$) Standard" have a tape thickness d of $d = 20 \times 10^{-6}$ m. Of these tape types, the tapes L500, L370 and L330 have a reel-hub radius R of R=15 mm and the tapes L250, L165 and L125 have a reel-hub radius of R=26 mm. The capstan-rotation detection pulses are set such that f=360 (Hz) when v=20 mm/sec. and the velocity of tape travel is set such that $V_P$=20 mm/sec. The calculating equation for calculating the remaining amount of time of tape by the use of the equation (31) is as follows:

$$\left.\begin{array}{l} Ts = 6.14 \times 10^{-4} \cdot G2 - 1.77 \times 10^3 \\ \text{(in case of } R = 15 \text{ mm)} \\ Ts = 6.14 \times 10^{-4} \cdot G2 - 5.31 \times 10^3 \\ \text{(in case of } R = 26 \text{ mm)} \end{array}\right\} \tag{32}$$

Accordingly, it is possible to determine the remaining amount of time Ts of tape by counting the number of motor-rotation detection pulses with respect to a one-rotation period of the supply reel and substituting the value thus counted in the equation (32).

The above-mentioned calculation of the remaining amount of time Ts of tape is carried out in the microcomputer. Further, in the foregoing description, determination is made of the remaining amount of time of tape by substituting the number G2 of the capstan-rotation detection pulses into the equation (32). However, depending on the purpose, obtaining the remaining amount of time of tape in units of approximately ten minutes can be in some cases sufficient. In such cases, determination is previously made from the equation (32) and by reverse operation of the number g2 of capstan-rotation detection pulses corresponding to the remaining amount of time Ts of tape in each unit of ten minutes, said numbers g2 being stored beforehand in RAM 33. The number G2 of capstan-rotation detection pulses actually obtained in accordance with the above-mentioned procedure is compared with the number g2 stored beforehand, and when coincidence therebetween has been obtained, the remaining amount of time of tape corresponding to said number G2 is displayed. Since this procedure does not necessitate the calculation of the equation (32) each time occasion demands, it offers the merit of simplifying the program involved.

It is to be noted that in the above-mentioned embodiments description was made using the video tape recorder, but that the present invention is not limited thereto. The invention is also applicable to a general type of tape recorders, etc.

As described above, the present invention makes it possible to calculate the remaining capacity of tape with high precision and without being affected by variations in the velocity of tape.

In the above description according to FIGS. 1 to 4, the counting means counting pulses related to the amount of tape travel is constructed of two of the pulse counters 25 and 26. However, even if there is only one pulse counter, the pulse numbers obtained from the pulse generator 27 correspond to the predetermined rotational period of each reel. When one counter is used, following a program procedure takes place. For example, for obtaining the pulse number from the pulse generator 27 during one rotation of the supply reel 20, first and second counted values of the counter are respectively stored in the RAM when first and eighth pulses are generated from the reel-rotation detecting means 24. Then, the difference between the first and second counted values is calculated. When the pulse number from the pulses generator 27 is obtained during one rotation of the take-up reel 19, the same procedure as described above is effected.

What is claimed is:

1. An apparatus for determining the type of tape assembly being used, said tape assembly having a supply reel, take-up reel, and tape, comprising:
   first reel-rotation detection means for generating pulses having a frequency corresponding to the rotational velocity of said take-up reel adapted to detect the rotation of said take-up reel;
   second reel rotation detection means for generating pulses having a frequency corresponding to the rotation of said supply reel adapted to detect the rotation of said supply reel;
   pulse generation means for generating pulses having characteristics related to the amount of travel of said tape transported between said take-up reel and said supply reel;
   pulse counter means for counting said pulses from said pulse generation means during predetermined rotational periods of said take-up reel and of said supply reel and producing values indicative thereof;

calculating means for determining a sum of the squares of said values counted by said pulse counter means;

memory means for storing a plurality of predetermined values related to standard tape characteristics; and discriminating means for comparing the value of said sum of squares obtained by said calculating means with a plurality of said predetermined values in said memory means, thereby determining a particular predetermined value nearest to said value of said sum of squares, whereby the type of said tape is determined to be the type corresponding to said particular predetermined value determined by said discriminating means.

2. The apparent according to claim 1, further comprising a control head for recording signals on a tape, and wherein said pulse generation means includes means for supplying a control signal to (1) said control head to be recorded on said tape and to (2) said pulse counter means.

3. The apparatus according to claim 1, wherein said pulse generation means includes a control head for reproducing a control signal recorded on said tape and amplifying means for amplifying and wave shaping said control signal and for coupling said amplified and wave shaped control signal to said pulse counter means.

4. The apparatus according to claim 1, wherein said pulse generation means includes a capstan motor for driving said tape to travel through a capstan shaft, capstan-rotation detection means for detecting the rotation of said capstan motor and generating a pulse having a frequency corresponding to the velocity of the capstan rotation, and means for permitting said pulse of said capstan rotation detection means to be input into said pulse counter means.

5. The apparatus according to claim 1, wherein said first and second reel-rotation detection means are respectively comprised of first and second rotary members, rotating in interlocking relation with said take-up reel and said supply reel and each having light transmitting and light obscuring spaces on their coaxial circumferences, and first and second photocouplers having optical elements disposed on farthest opposite sides of rotational loci of said light transmitting spaces provided in said first and second rotary members, respectively.

6. The apapratus according to claim 5, wherein a plurality of said light transmitting spaces of said first and second rotary members are located equidistantly on the coaxial circumference.

7. The apparatus according to claim 1, wherein said first and second reel-rotation detection means are comprised of first and second rotary members rotating in interlocking relation with said take-up reel and said supply reel and each having permanent magnets on their coaxial circumferences, and first and second means for detecting a magnetic field, provided at fixed positions opposite the rotational loci of said permanent magnets of said first and second rotary members.

8. The apparatus according to claim 1, which further comprises:

remaining-amount-of-tape calculating means for calculating means for calculating the length of tape remaining on said supply reel, by using said indicative value from said pulse counter means corresponding to said supply reel, and the particular predetermined value peculiar to tape determined by said discriminating means, and display means for displaying the remaining length of the tape in accordance with the output of said remaining-amount-of tape calculating means.

9. The apparatus according to claim 1, which further comprises:

remaining-amount-of-tape calculating means for calculating the length of tape remaining on said supply reel, by using said indicative value from said pulse counter means corresponding to said supply reel and the particular predetermined value peculiar to tape determined by said discriminating means, means for calculating the remaining amount of time of tape on said supply reel by using the value obtained from said remaining-amount-of-tape calculating means and the value of velocity of tape travel, and display means for displaying the remaining amount of time of tape in accordance with the output from said means for calculating the remaining amount of time of tape.

10. The apparatus according to claim 8, wherein said remaining-amount-of-tape calculating means includes a circuit for calculating the remaining length of tape by the use of the equation:

$$LS = \frac{v^2}{4\pi f^2 d} \cdot G2^2 - \frac{\pi R^2}{d}$$

where LS represents the remaining length; d represents the thickness of a tape currently in use; R the radius of reel hub; $(v/f)^2$ the square of the specified ratio between the number of capstan-rotation detection pulses and the velocity of tape travel; and G2 the number of the capstan-rotation detection pulses measured during a specified rotational period of said supply reel.

11. The apparatus according to claim 8, wherein said means for calculating said remaining amount of time of tape includes means for calculating the remaining amount of time of tape by the use of the equation:

$$TS = \frac{1}{V_P} \cdot \frac{1}{4\pi d} \left(\frac{v}{f}\right)^2 \cdot G2^2 - \frac{\pi R^2}{dV_P}$$

where TS represents remaining amount of time; $V_p$ represents the velocity of tape travel; d the thickness of a tape currently in use; R the radius of reel hub; $(v/f)^2$ the specified ratio between the number of capstan-rotation detection pulses and the velocity of tape travel; and G2 the number of the capstan-rotation detection pulses measured during a specified rotational period of said supply reel.

12. An apparatus as in claim 1 wherein said predetermined rotational periods of said take-up reel and of said supply reel are determined by counting a predetermined number of said pulses from said first and said second reel rotation detection means respectively.

13. An apparatus for determining the type of a tape assembly being used, said tape assembly including recording tape transported between supply and take-up reels, said apparatus of the type including means for sensing rotational velocities of said supply and take-up reels, and producing pulses proportional thereto, means for counting the pulses, means for calculating a sum of squares of said counted values, and means for comparing the value of said sum of squares with prestored characteristics representing standard tape types, the improvement comprising:
  pulse generation means for generating pulses having characteristics related to the amount of travel of said recording tape transported between said tape-up reel and said supply reel;

said counting means counting the number of pulses from said pulse generation means during a predetermined rotational period of said take-up reel and said supply reel said predetermined rotational period being determined by a predetermined number of said pulses sensed by said means for sensing;
thereby determining said sum of squares value in a way which is tape speed independent.

* * * * *